Feb. 21, 1961  Z. C. POSSIS ET AL  2,972,232
WELDING APPARATUS FOR BAND SAW BLADES
Filed Feb. 4, 1959  4 Sheets-Sheet 4

Inventors
Zinon C. Possis
James S. Kawabata
Eugene N. Connoy

United States Patent Office 2,972,232
Patented Feb. 21, 1961

2,972,232

WELDING APPARATUS FOR BAND SAW BLADES

Zinon C. Possis, Minneapolis, Minn., James S. Kawabata, Chicago, Ill., and Eugene N. Connoy, Minneapolis, Minn., assignors to Continental Machines, Inc., Savage, Minn., a corporation of Minnesota Filed Feb. 4, 1959, Ser. No. 791,069

6 Claims. (Cl. 60—97)

This invention relates to welding apparatus for joining the ends of band saw blades, and refers more particularly to the provision of an improved welding apparatus which is especially suited for use with saw blades that are made of high speed tool steel and are intended primarily, though not exclusively, for use on band sawing machines for cutting metal.

As is well known, such band sawing machines are provided with an endless flexible saw band which is trained about driving and idler pulleys, with a straight stretch of the band arranged for straight line travel through a cutting zone. The saw band of each band sawing machine, of course, comprises a length of saw blade having its opposite ends welded together to form the blade into an endless band.

Such joining together of the saw blade ends is usually accomplished by resistance welding, for example, with apparatus such as disclosed in Patent No. 2,293,481 issued to Leighton A. Wilkie on August 18, 1942. In such apparatus, the blade ends are clamped in a pair of vises and held with their extremities in endwise aligning and abutting relation while welding current is passed from one end of the blade to the other to heat the blade ends to a desirably high welding temperature. As the metal softens, one of the vises is moved toward the other to upset the metal and produce the welded joint. Excess material at the joint is usually ground away, after tempering or annealing the welded joint.

While most welding apparatus heretofore used for this purpose proved satisfactory for joining the ends of ordinary carbon steel saw blades, it was incapable of producing uniformly good results with saw blades made from high speed tool steels. In general, conventional welding apparatus failed to produce a satisfactory weld, capable of withstanding the high tension stresses imposed upon tool steel bands during sawing, primarily because it was next to impossible to exercise close control over such critical factors as heating of the blade ends to the proper welding temperature, and pressures with which the blade ends were forced together.

Broadly speaking, it is the purpose of this invention to provide a welding apparatus of improved construction, which is not only capable of effecting good welded joints between the ends of band saw blades made from ordinary steels, but is especially well suited for joining the ends of those made from high speed tool steels.

As in conventional apparatus for butt welding the ends of band saw blades, the apparatus of this invention also comprises a vise structure consisting of a pair of cooperating relatively movable vises. These vises are provided with movable jaws by which they are able to clampingly receive the end portions of a saw blade to be welded and to hold the same with the extremities of the blade in opposing but contiguous relation while welding current is passed from one end of the blade to the other.

It is one of the objects of this invention, however, to provide welding apparatus capable of producing accurately controlled substantially slow relative movement of the vises toward one another for a predetermined period of time during which the ends of the blade are heated to an optimum welding temperature by the passage of welding current from one end of the blade to the other, and by which the vises are thereafter quickly moved relatively toward one another to effect upsetting and completion of the welded joint between the blade ends.

More specifically it is an object of this invention to provide welding apparatus of the character described wherein power is applied to the vise structure through an actuating member to effect relative motion of the vises toward one another, and wherein a power driven movable control element acts upon the actuating member to predetermine the rate of relative movement of the vises toward one another under the influence of the power means therefor.

In this connection it is another purpose of this invention to provide readily adjustable restraining means for the power driven control element, which acts thereon to retard and control the rate of movement imparted thereto by its power means so as to accurately govern the relative motion of the vises toward one another.

In a specific embodiment of the invention, the movable control element is provided by a rotatable cam which is driven in one direction by an air cylinder, and the actuating member has means thereon providing a cam follower that is held engaged with the working surface of the cam by the power means employed to exert force on the vise structure.

Hence, relative motion of the vises toward one another depends entirely upon the rate of cam rotation and the shape of its working surface.

Also according to this invention, highly accurate control over the speed of cam rotation is made possible through the provision of adjustable restraining means therefor, preferably in the form of a hydraulic cylinder having its work performing element drivingly connected with that of the air cylinder by which the cam is driven, and having its opposite ends connected together in a closed hydraulic circuit by a duct having a throttle valve therein.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate one complete example of the physical embodiment of the invention constructed according to the best mode so far devised for the practical application of the principles thereof, and in which.

Figure 1:
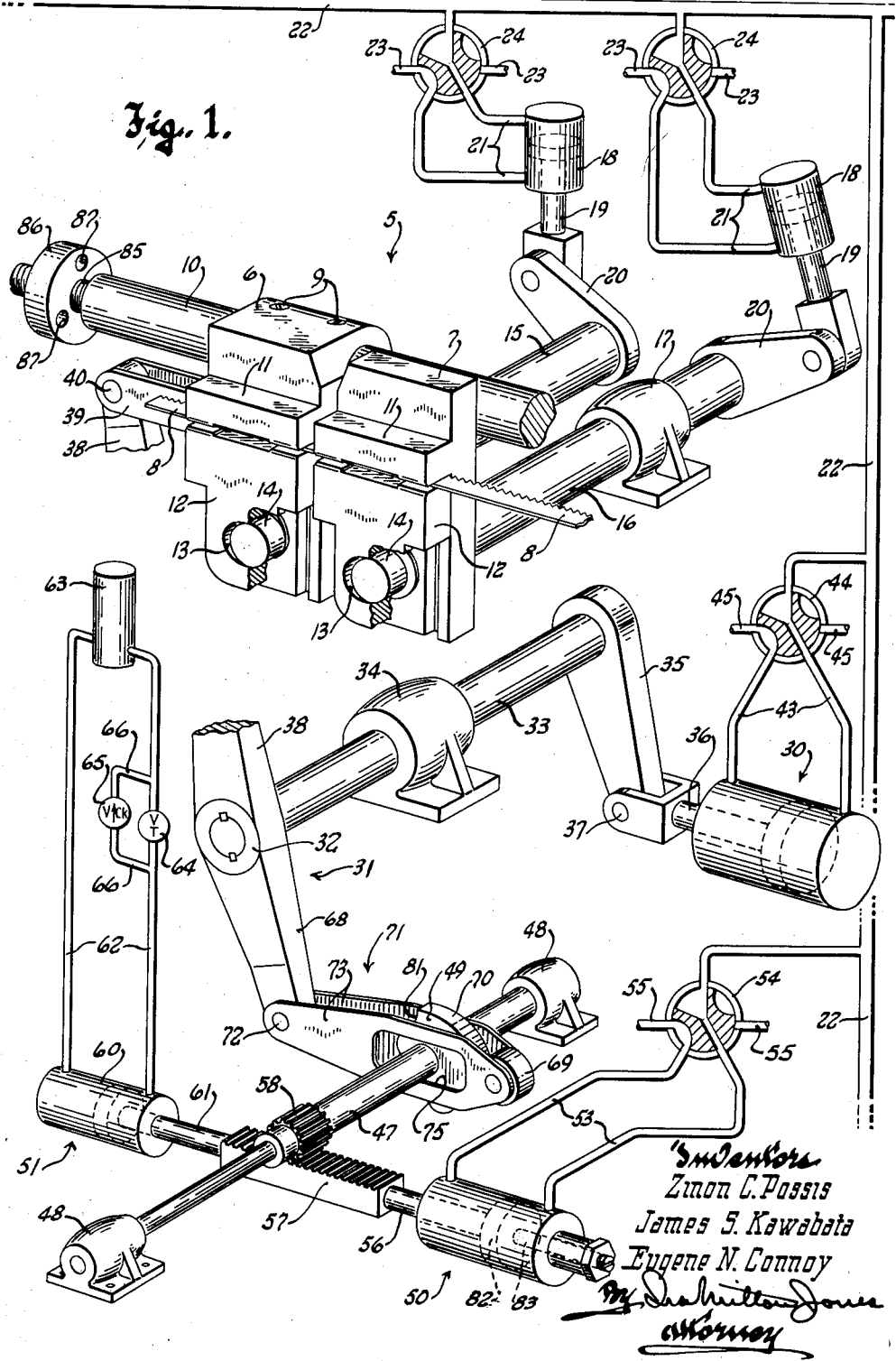
Figure 1 is a diagrammatic perspective view of the welding apparatus of this invention.

Referring now more particularly to the accompanying drawings, wherein like reference characters have been applied to like parts throughout the several views, the numeral 5 generally designates a vise structure comprising a pair of relatively movable vises 6 and 7 which are adapted to clampingly receive the opposite end portions of a band saw blade 8, and hold them with their extremities in opposing contiguous relation. In the present case, the vise 7 may be considered to be stationarily mounted in any suitable fashion on the exterior of a housing, not shown, while the vise 6 is mounted for translatory motion toward and from the stationary vise 7. For this purpose, the movable vise may be secured by set screws 9 to a shaft 10 suitably endwise slidably mounted in bearings (not shown) that constrain the vise for movement with the shaft toward and from the stationary vise 7.

The construction of the vises may follow conventional practice insofar as they are provided with stationary jaws 11 which project from the fronts of the vises, in horizontal alignment with one another. Also mounted on the front of the vises are movable jaws 12 which are constrained to up and down vertical motion beneath the stationary jaws 11. Each of the movable jaws 12 has a horizontal slot 13 therein to receive an eccentric 14. The eccentrics are formed on the forward ends of a pair of rock shafts 15 and 16 suitably journaled in bearings, such as indicated at 17 for rotation on parallel horizontal axes that are disposed normal to the path of travel of the movable vise 6. The bearings journaling the shaft 15 for the movable vise 6 may themselves be mounted for back and forth motion crosswise of the shaft so as to enable the latter to move bodily with the vise 6.

Oscillatory motion of the rock shafts in one direction or the other thus causes up and down or blade clamping and blade releasing motion to be imparted to the movable jaws through the engagement of the eccentrics 14 in the horizontal slots 13 of the movable jaws.

Any suitable means may be provided for imparting rocking motion to the shafts 15 and 16 in one direction or the other. In the present case, each of the shafts is power operated by a double acting air cylinder 18 having its work performing element or piston rod 19 pivotally connected to the outer end of a lever arm 20 fixed on the rear of the shaft. A pair of ducts 21 connect with the opposite ends of each cylinder, and these ducts are selectively connectible with either an air pressure supply line 22 or an exhaust line 23 through a manually operable control valve 24.

In the positions of the control valves 24 shown, air under pressure in the supply line 22 is directed into the upper ends of both air cylinders 18, and their lower ends are connected to the exhaust lines 23. Consequently, the piston rods or work performing elements 19 of the cylinders exert forces upon the shafts through the lever arms 20 in directions to effect upward or closing motion to the movable jaws 12, to thus maintain both of the vises in their operative positions at which they hold the end portions of the saw blade in proper endwise aligning and contiguous relationship for welding.

According to this invention motion is imparted to the movable vise 6 in directions to carry it toward or from the stationary vise 7 by means of a power operator 30, acting through an actuating member 31. The power operator is provided by an air cylinder of the double acting type, and the actuating member 31 is a lever having a hub 32 intermediate its ends by which it is secured to one end of a rock shaft 33 journaled in a bearing 34 for rotation on a horizontal axis crosswise of the path of movement of the vise 6. The rock shaft also has affixed thereto a lever arm 35, and the work performing element or piston rod 36 of the air cylinder 30 is pivotally connected as at 37 to the outer end of the lever arm 35, so that the cylinder may impart rotary motion in one direction or the other to the rock shaft through the lever arm 35.

The actuating member or lever 31 has an upwardly extending arm 38 which is operatively connected with the movable vise 6 by means of a link 39. Pins 40 passing through each end of the link and through suitable apertures in the upper end of the arm 38 and in lugs 41 on the vise 6 provide for a degree of pivotal motion of the link with respect to the vise 6 as the operating lever 31 is rocked back and forth with the shaft 33 under the action of the air cylinder 30 on the shaft.

As in the case of the cylinders 18, the air cylinder 30 also has ducts 43 connected with its opposite ends and leading into a manually operable control valve 44 to enable selective connection of either end of the cylinder with the air supply line 22 and the other end of the cylinder with an exhaust line 45.

Although the air cylinder 30 is capable of moving the vise 6 either toward or from stationary vise 7, it is a feature of this invention that other means is provided to act in cooperation with the cylinder 30 to achieve highly accurate control over the rate and extent of motion of the vise 6 toward the stationary vise 7. This control means includes a shaft 47 journaled in bearings 48 for rotation on a fixed horizontal axis parallel to the rock shaft 33, a control cam 49 fixed on the shaft 47 to rotate therewith, a power operator or air cylinder 50 for imparting rotation to the cam shaft and the cam thereon, and restraining means 51 also connected with the control cam to retard and accurately control the rate at which the cam is rotated by the air cylinder 50.

The cam driving cylinder 50 is also of the double acting type, and has ducts 53 connected with its opposite ends and leading into a manually operable control valve 54 by which either end of the cylinder may be selectively connected with the air supply line 22 and its other end connected with an exhaust line 55. The work performing element or piston rod 56 of the air cylinder 50 extends horizontally crosswise of the cam shaft and is drivingly connected with one end of an elongated rack 57 located to pass under a portion of the cam shaft. The teeth of the rack are formed on its upper surface so as to mesh with a pinion 58 fixed on the cam shaft. Thus, by reason of the meshing engagement between the rack and the pinion, the cam may be rotated in one direction or the other by the air cylinder 50, depending upon the position of the manually operable control valve 54.

The cam restraining means 51 comprises a double acting hydraulic cylinder 60 having its work performing element or piston rod 61 coaxial with the work performing element 56 of the air cylinder, but drivingly connected to the opposite end of the rack 57. Consequently, the air cylinder 50 acts as a driver for the piston rod 61 of the hydraulic cylinder 60.

The opposite ends of the hydraulic cylinder 60 are connected to one another, in closed circuit relationship, by a duct 62 having an accumulator 63 and a throttle valve 64 connected therein. The throttle valve meters the flow of hydraulic liquid into the front of the cylinder 60 from its rear as a consequence of extension of the piston rod 56 of the air cylinder and the resulting depression of the piston rod 61 into the hydraulic cylinder.

As shown, the throttle valve is connected in that branch of the duct 62 which leads to the front of the hydraulic cylinder 60, namely that end of the cylinder from which the work performing element 61 projects. Preferably a check valve 65 is connected in a bypass duct 66 which has its ends leading into the branch 62 of the duct containing the throttle valve 64, at opposite sides of the valve. The check valve is positioned to open only upon extension of the piston rod 61 to exhaust fluid from the front end of the cylinder 60, so as to enable unhindered retraction of the piston rod 56 of the air cylinder 50.

It is a feature of the restraining means 51 that the throttle valve 64 may be adjusted to so limit the flow of hydraulic fluid from the rear to the front end of the hydraulic cylinder 60 as a consequence of extension of the piston rod of cylinder 50, that the hydraulic cylinder serves to retard the speed at which the piston rod 56 can be extended. As a result, the control cam 49 will be rotated by its cylinder 50 at a slow but uniform rate of speed which may be accurately predetermined and regulated to suit different welding conditions merely by suitable adjustment of the throttle valve 64 in the closed circuit for the hydraulic cylinder 60. The rate at which the cam is allowed to rotate, of course, is preferably always less than that which would ordinarily be imparted to the cam by its cylinder 50 without the retarding effect of the restraining means 51.

The control cam 49 is employed in this invention to govern the rate at which the movable vise 6 will be propelled toward the stationary vise 7 by the vise translating cylinder 30. For this purpose the control cam 49 is caused to act upon the downwardly extending arm 68 of the actuating lever 31 through a cam follower 69 which in effect forms part of the downwardly projecting arm of the lever 31. The cam follower 69 engages the working surface 70 of the control cam at the side of the cam remote from the lever arm 68, and it is mounted on one end of a carrier 71 having its other end pivotally connected as at 72 to the extremity of the downwardly extending arm 68 of the vise actuating lever.

The carrier 71 preferably comprises a pair of flat link-like elements 73 which embrace the lower end of the lever arm 68, the control cam 49, and the cam follower or roller 69. The central portions of the link-like members 73 are provided with horizontally elongated slots 75 through which the camshaft 47 projects, so that the carrier 71 may be said to be partially supported by the lever arm 68 and partly by the camshaft itself.

The slots 75 have a vertical dimension greater than the diameter of the camshaft, and the length of the slots is such as to readily enable the lever 31 to be swung in a counterclockwise direction to carry the follower 69 away from the cam, as occurs when the cylinder 30 is actuated to effect movement of the vise 6 away from the stationary vise 7.

Thus it will be seen that whenever the vise transporting cylinder 30 is operating to impart clockwise motion to the rock shaft 33 and to the actuating lever thereon, the cam follower or roller 69 will be forcefully held against the periphery of the cam 49. Accordingly, the control cam governs cylinder produced motion of the movable vise 6 towards the stationary vise 7 in accordance with the setting of the throttle valve 64 and the shape of the working surface 70 on the control cam. In other words, the vise transport cylinder 30 is capable of moving the vise 6 toward the vise 7 only as fast as the control cam 49 will permit it to at any predetermined setting of the throttle valve 64 of the restraining means 51.

Figure 2:
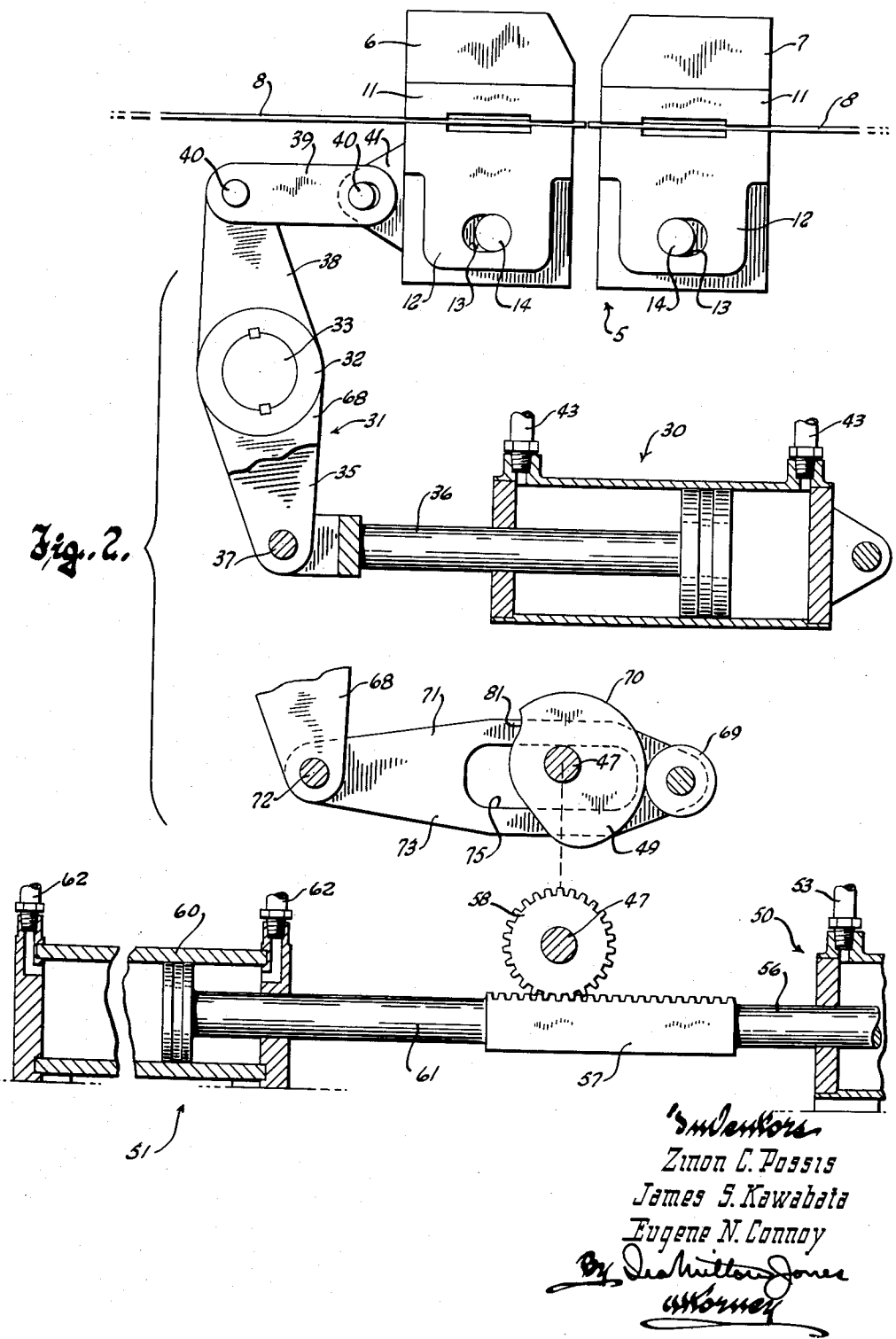
Figure 2 is a more or less diagrammatic view showing the positions of the components of the apparatus at the start of a welding operation.

As best shown in Figure 2, the control cam 49 is so shaped that its working surface 70 constitutes a little over one-half of the periphery of the cam. It has a uniform radius and is slightly eccentric to the axis of the camshaft, in a direction such that the portion of the working surface most remote from the camshaft axis is lowermost at the start of a welding operation. The other end of the working surface is at the top of the cam, and adjacent to an abrupt notch or declivity 81 in the periphery thereof. Consequently during rotation of the control cam in the clockwise direction necessary to effect movement of the vise 6 toward the stationary vise 7, the working surface of the cam tends to constantly and uniformly drop away from the cam follower 69 to enable the latter to be moved toward the camshaft under the action of the air cylinder 30 on the actuating lever 31.

At the start of a welding cycle, the position of the parts comprising the welding apparatus of this invention are as shown in Figure 2. The roller or cam follower 69 is engaged with the working surface 70 of the control cam at a zone just below that defined by the intersection of said surface with a horizontal plane containing the camshaft axis. The vises 6 and 7 are spaced apart, a substantial distance determined by the engagement of the follower 69 with the control cam, and they may have the ends of a band saw blade to be welded together clamped in their jaws with the blade extremities in opposing but contiguous relation, i.e., either lightly engaging or spaced apart a slight distance.

As shown in Figure 2, the cam 49 is in its limit of counterclockwise rotation defined by the engagement of the piston 82 of the cam driving cylinder 50 with an adjustable stop 83 provided by the inner end of a screw threaded into the rear end of the cylinder. The cam follower 69, therefore, engages the working surface 70 of the control cam about one-third of the distance "downhill" from the "highest" point of the cam surface.

Following each welding cycle, the operator actuates the control valve 54 to effect driving of the cam 49 in the reverse or counterclockwise direction to the position shown in Figure 2, which can be considered the starting point of a new welding cycle. It will be appreciated, however, that because of the fact that the piston stop 83 on the cam driving cylinder 50 is adjustable, the starting point on the control cam with respect to the cam follower 69 may be such as to present almost any point on the working surface of the cam to the follower.

The operation of the welding apparatus of this invention will be best understood from the following description of a complete welding cycle.

The end portions of a length of band saw blade to be welded together are inserted into the open jaws of the vises, preferably while the vises are in a spread apart position to which they may be moved by the air cylinder 30. The operator then actuates the control valves 24 governing the cylinders for the movable jaws 12 of the vises to actuate the latter to their operative positions at which they cooperate with the stationary jaws to firmly clamp the blade ends in the vises. The operator may then actuate the manual control valve 44 for the air cylinder 30 governing translation of the movable vise 6, to direct air under pressure into the rear end of the air cylinder. The resulting projection of the piston rod 36 of the cylinder causes clockwise rocking motion to be imparted to the rock shaft 33 and the actuating lever 31 thereon to bring the cam follower 69 into pressure engagement with the working surface 70 of the control cam. Such clockwise rocking motion of the actuating lever also moves the vise 6 toward the stationary vise 7 to accurately position the vise 6 fixed with respect to the vise 7 for the start of the welding operation. It is assumed, of course, that the blade ends have been so placed in the vises that the initial motion of the vise 6 toward the vise 7 in the manner described brings the extremities of the blade ends into contiguous relation, either lightly engaging one another, or slightly spaced apart as shown.

The cam, during subsequent rotation thereof in a clockwise direction under the control of its cylinder 50 and as retarded by the restraining means 51, will thereafter govern the rate at which the movable vise 6 is moved toward the stationary vise 7 under the force applied thereto by the air cylinder 30 acting through the actuating lever 31.

Welding current, from a source thereof, is then passed from one end of the blade to the other. This is usually accomplished by connecting the jaws of the vises themselves with the source of welding current. The high resistance and arcing that occurs between the contiguous ends of the blade thus results in rapid heating of the metal from which the blades are formed. Substantially simultaneously with closure of the welding circuit, however, the operator actuates the manual control valve 54 to its position shown in Figure 1 to start the control cam rotating in the clockwise direction. This results from the introduction of air under pressure into the rear of the cylinder 50, behind the piston 82 therein, and the consequent projection of the work performing element 56 of the cylinder to drive the rack 57 toward the hydraulic cylinder 60 of the restraining means 51. Such translation of the rack 57 toward the hydraulic cylinder 60 imparts slow clockwise rotation to the cam shaft 47, through the pinion 58, at a rate determined by the setting of the throttle valve 64 in the duct means connecting the opposite ends of the hydraulic cylinder in closed circuit relationship.

The control cam 49 is thus caused to rotate in a clockwise direction at an accurately governed uniform rate of speed which is less than that which the air cylinder 50 would ordinarily impart thereto without the presence of the restraining means 51. During such rotation of the cam, the working surface 70 thereof presented to the follower 69 constantly diminishes in radius so that the follower in effect slowly moves in a "downhill" direction toward the camshaft under the action of the vise translating cylinder 30 on the lever 31. The cam thus accurately controls the clockwise rocking motion of the actuating lever 31 through which the cylinder 30 acts to impart motion to the vise 6 toward the stationary vise 7.

Figure 3:
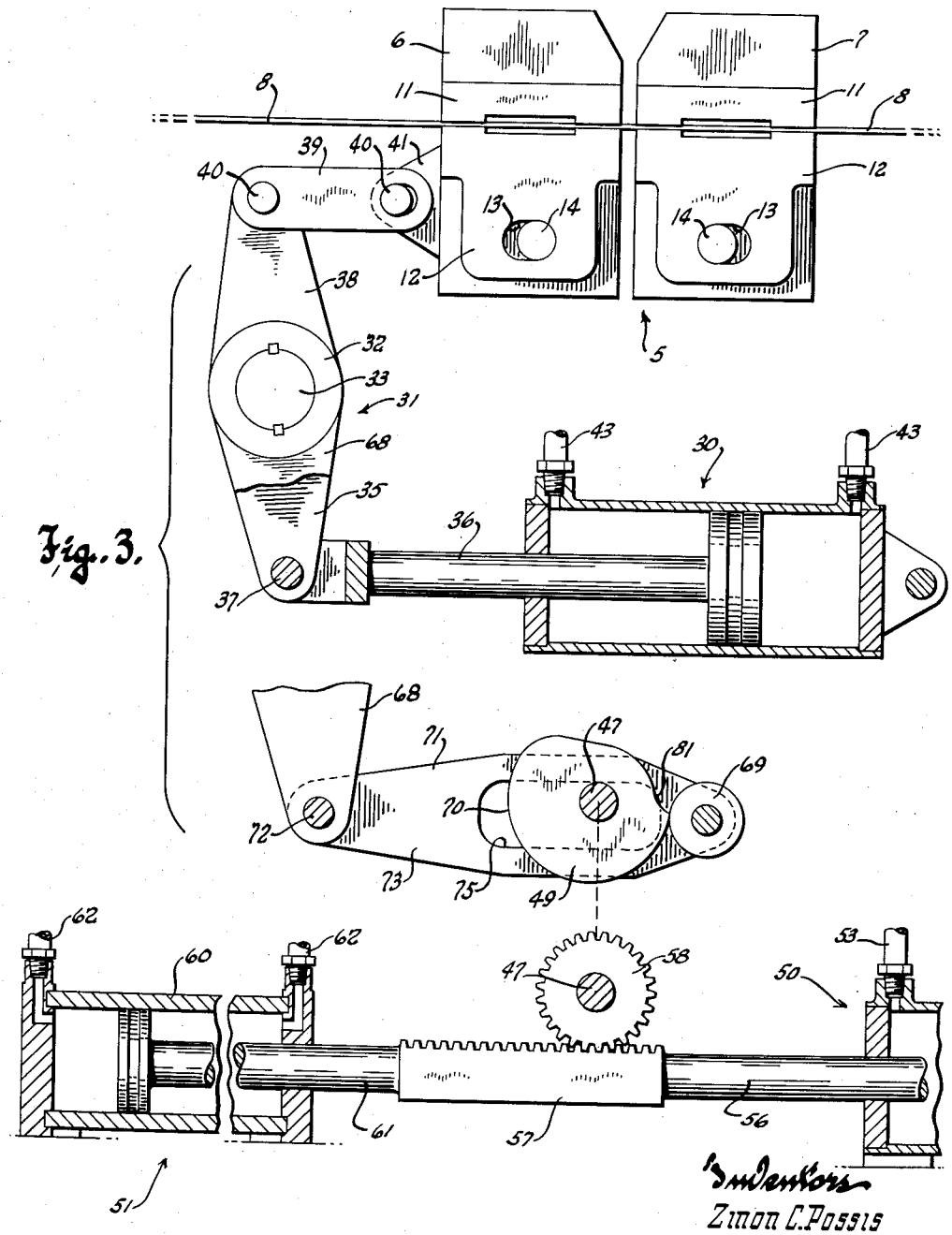
Figure 3 is a side elevational view similar to Figure 2 but showing the positions of the parts near the conclusion of the welding operation.

It will be seen, therefore, that as the blade ends heat up, the vises will be moved relatively toward one another at an accurately controlled rate determined by the speed of rotation of the cam 49 and the "drop" of its working surface. Such relative translation of the vises toward one another continues at a uniform slow rate under the control of the cam 49 until the abrupt declivity or drop-off 81 closely approaches the follower 69, as seen in Figure 3. By the time the control cam reaches this position, the vises have been relatively moved toward one another a distance equal to about one-half of their spacing at the starting point shown in Figure 2, and the heat-softened blade ends have been firmly pressed together.

Figure 4:
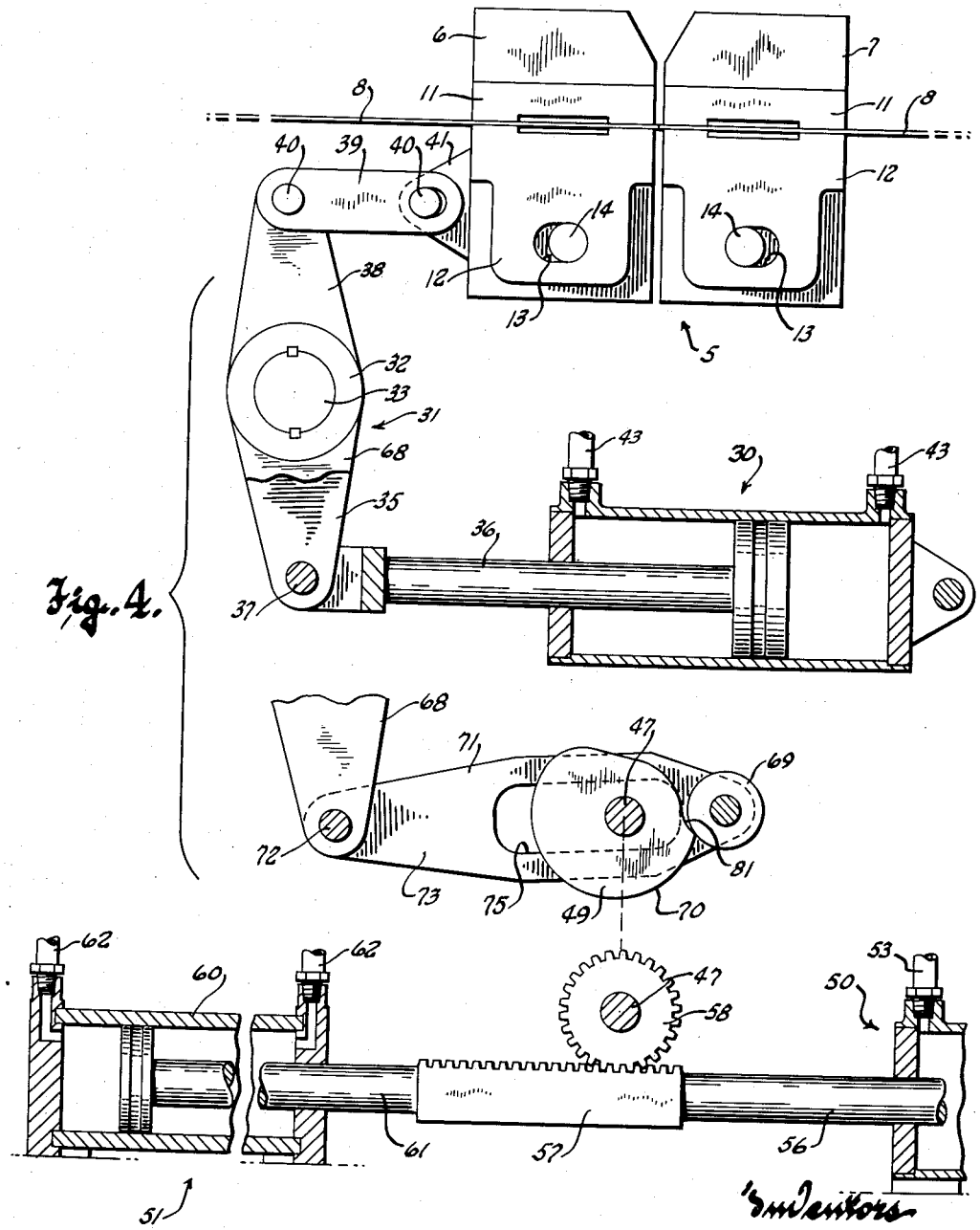
Figure 4 is a view similar to Figure 3 but illustrating the positions of the parts at the completion of the welding operation.

Further slight clockwise rotation of the control cam 49 from its Figure 3 position thereafter causes the follower 69 to abruptly leave the working surface 70 of the cam and drop into the notch or declivity 81, as shown in Figure 4. By that time, the ends of the saw blade in the vises have been heated to the desired welding temperature, and as the cylinder 30 suddenly propels the follower 69 into the notch 81 in the cam, it also acts through the lever 31 to quickly move the vise 6 toward the vise 7 and jam together or upset the ends of the blade to complete the weld.

It should be noted, however, that the elongated horizontal slots 75 in the carrier 71 for the cam follower assure the desired abrupt "dropping" of the follower into the declivity 81 of the cam. These slots are so proportioned as to allow the carrier to swing up and down a limited degree about its pivotal connection 72 with the arm 68 of the actuating lever, so that while the carrier normally rests upon the camshaft, it is free to suddenly pivot upwardly as soon as the follower 69 passes over the corner at the junction between the declivity 81 and the working surface 70 of the control cam. This enables the follower to quickly snap into the declivity under the force applied to the lever by the air cylinder 30, without waiting for the slowly rotating control cam to fully align the declivity with the cam follower.

Thus it will be seen that the cam follower 69 is quickly propelled into the declivity to allow the air cylinder 30 to also quickly propel the movable vise 6 toward the stationary vise 7, to firmly jam together the ends of the saw blade which are now at the welding temperature. This concludes the welding operation.

The welding current may then be shut off either manually or automatically, such as by the engagement of a part on the lower arm 68 of the actuating lever 31 with means (not shown) that disrupts the flow of welding current through the vise jaws. One of the jaws 12 of the vises may then be released by proper operation of the control valve 24 governing the cylinder for the jaw, and the control valve 44 governing the cylinder 30 may then be actuated to effect retraction of its piston rod 36. This quickly moves the vise 6 to an annealing position (not shown).

The air cylinder 30 is unrestrictedly able to impart counterclockwise motion to the actuating lever 31 at this time partly by reason of the slots 75 in the carrier 71 and partly because such motion carries the control cam 49 away from the cam.

The spacing between the stationary and movable vises in the annealing position thereof (not shown) is adjustably determined by the engagement of one end of the shaft 10 with a stop 85. This stop is provided by a screw threaded through an adapter 86 that may be secured to a wall of a housing in which most of the apparatus is enclosed. Holes 87 in the adapter are provided for that purpose, and it will be understood that the screw may enter a hole in the adjacent housing wall to provide for its engagement by the shaft 10.

After having moved the vise 6 to the annealing position described, the operator may reclose whichever jaw 12 of the vises had been released just prior to movement of the vise 6 to its annealing position, and he then actuates the control valve 54 to reverse the air cylinder 50, i.e., to cause the work performing element 56 to be retracted into the cylinder, thus moving the rack toward the air cylinder and imparting counterclockwise rotation to the control cam to return the same to its starting position seen in Figure 2. This position, as stated previously, is determined by the engagement of the piston 82 of the cylinder with the adjustable stop 83 on the rear of the cylinder.

The welded joint thus effected between the ends of the blade may be annealed by passing a low voltage and current from the jaws of one vise to the other, through the weld, while the vises are in their spread apart or annealing position described, and upon the conclusion of the annealing step the operator may release the movable jaws 12 of both vises to enable the blade to be removed therefrom. This, of course, entails suitable actuation of the control valves 24 governing the operativeness of the vises. The welded joint thereafter is ground flush with the opposite faces of the band.

From the above, it will be appreciated that one of the main features of the welding apparatus of this invention is that a single control cam 49 may be used to control the butt welding of metal band saw blades of different widths, thicknesses, and composition, merely by making the proper adjustments to the throttle valve 64 of the restraining means 51, and to the adjustable stop 83 on the rear of the air cylinder 50. These adjustments, of course, determine the speed at which the cam rotates, and the angular distance through which the cam must be rotated from its starting point before the cam follower 69 is caused suddenly to drop into the declivity 81.

From the foregoing description taken together with the accompanying drawings, it will be readily apparent to those skilled in the art that this invention provides improved welding apparatus for joining together the ends of band saw blades, and which apparatus not only achieves highly accurate control over the welding operation but also features ready adjustability to assure the desired functioning of the apparatus with blades of different widths, thicknesses, and metal composition.

What is claimed as our invention is:

1. Mechanism to effect controlled approach of the work holding devices of a butt welding machine comprising: a fluid motor having an actuator drivingly connected with one of the work holding devices to drive the same towards the other during work performing motion of the actuator; cooperating relatively movable members serving as an overcenter mechanism for governing the rate of work performing movement of the actuator, said members being relatively movable rapidly from one positional relationship to another as a consequence of slow relative movement of two of said members in a direction to bring a point on one of them to and through a dead center relationship of the mechanism, one of said two members being a cam having a gradually descending gradient and an abrupt declivity at the low end of the gradient, the low end of the gradient being said point, the other of said two members being a cam follower riding on the cam down said gradient and into the declivity during movement of the cam in one direction, and a third one of said members tractively connecting one of said two members with the actuator; means providing a support for the other of said two members, said support being fixed with respect to the fluid motor; power means connected with said overcenter mechanism to effect slow relative movement of said two members in said direction; the overcenter mechanism being so related to said support and the actuator that the work performing force applied to the actuator biases the cam and cam follower into engagement with one another to thereby resist and control work performing movement of the actuator in accordance with the shape of the cam and rate of relative movement between the cam and the follower, the work performing force applied to the actuator maintaining said relatively movable members in said one positional relationship as long as the locus of engagement between the cam follower and the cam is moving towards dead center, and at the instant said point moves into and through dead center, said force effecting substantially instantaneous relative movement between the cam and the cam follower an extent sufficient to allow sudden entry of the cam follower into the declivity of the cam, to thereby substantially instantaneously free the actuator for unrestricted work performing motion.

2. Mechanism to effect controlled approach of the work holding devices of a butt welding machine comprising: a fluid motor having an actuator drivingly connected with one of the work holding devices to drive the same towards the other during work performing motion of the actuator; overcenter mechanism for governing the rate of work performing movement of the actuator, said mechanism comprising a rotary cam member having a gradually descending gradient and an abrupt declivity at the low end of the gradient, a cam follower member riding on the cam member down its gradient and into the declivity during rotation of the cam member in one direction, means forming a motion transmitting connection between one of said members and the actuator, and a support for the other member fixed with respect to the fluid motor; and power means drivingly connected with the cam member to rotate the same in said direction; the overcenter mechanism being so related to said support and the actuator that the work performing force applied to the actuator biases said members into engagement with one another to thereby resist and control work performing movement of the actuator in accordance with the shape of the cam member and the rate of its rotation, the work performing force applied to the actuator maintaining the overcenter mechanism at one side of dead center as long as the locus of engagement between said members is moving down the gradient towards the declivity and until the locus of engagement between said members reaches the low end of the gradient at which time said force snaps the mechanism across dead center and thereby substantially instantaneously moves said members relative to one another to a positional relationship in which the cam follower member has entered the declivity and the actuator is free for unrestrained work performing motion.

3. Mechanism to effect controlled approach of the work holding devices of a butt welding machine comprising: a fluid motor having an actuator drivingly connected with one of the work holding devices to drive the same toward the other during work performing motion of the actuator; an overcenter mechanism to constrain work performing motion of the actuator to a relatively slow rate for a predetermined period of time and then abruptly release the actuator for unrestrained work performing motion, said overcenter mechanism comprising: a power driven cam which is slowly rotated in one direction about an axis fixed with respect to the fluid motor, said cam having a gradually descending gradient and an abrupt declivity at the low end of the gradient, a cam follower connected with the actuator in motion transmitting relation so that work performing force applied to the actuator is also exerted on the cam follower, the cam follower riding on the cam to govern work performing motion of the actuator in accordance with shape of the cam, the engagement of the low end of the gradient with the cam follower defining the dead center position of the mechanism, means mounting the cam follower for bodily movement in opposite directions with respect to the cam between positions at opposite sides of dead center of the mechanism, and stop means defining one of said positions and in which position work performing force exerted on the cam follower tends to move the follower bodily in the direction of cam rotation until the low end of the gradient is carried past dead center, at which instant said force snaps the follower in the opposite direction across dead center to substantially instantaneously free the actuator for unrestrained work performing motion as a consequence of the sudden entry of the cam follower into the declivity independently of the rate of rotation of the cam.

4. The mechanism set forth in claim 4 wherein the cam follower engages the cam at one side thereof, and is connected by a link with a portion of the actuator located at the opposite side of the cam, so that said link is placed in tension by the work performing force applied to the actuator.

5. The mechanism set forth in claim 4 wherein the cam is mounted on a shaft fixed with respect to the fluid motor, and wherein said stop means comprises the cam shaft and a part on the link engageable with the shaft.

6. The mechanism set forth in claim 5 wherein the link has a hole through which the shaft loosely passes, and wherein said part on the link is an edge portion of the hole.

References Cited in the file of this patent

UNITED STATES PATENTS

| | | |
|---|---|---|
| 1,459,885 | Hadley | June 26, 1923 |
| 1,892,208 | Ferris et al. | Dec. 27, 1932 |
| 2,002,007 | Hanson | May 21, 1935 |
| 2,015,914 | Weightman | Oct. 1, 1935 |
| 2,298,051 | Gordon et al. | Oct. 6, 1942 |
| 2,492,200 | Stieglitz | Dec. 27, 1949 |

UNITED STATES PATENT OFFICE
CERTIFICATION OF CORRECTION

Patent No. 2,972,232                  February 21, 1961

Zinon C. Possis et al.

It is hereby certified that error appears in the above numbered patent requiring correction and that the said Letters Patent should read as corrected below.

Column 10, line 19, before "shape" insert -- the --; line 36, for the claim reference numeral "4" read -- 3 --.

Signed and sealed this 11th day of July 1961.

(SEAL)
Attest:

ERNEST W. SWIDER
Attesting Officer

DAVID L. LADD
Commissioner of Patents